United States Patent
Komachi et al.

[11] Patent Number: 5,463,651
[45] Date of Patent: Oct. 31, 1995

[54] LASER BEAM GENERATOR

[75] Inventors: Yuichi Komachi, Tokyo; Moriaki Wakaki, Kanagawa, both of Japan

[73] Assignee: Kabushiki Kaisha Machida Seisakusho, Tokyo, Japan

[21] Appl. No.: 10,309

[22] Filed: Jan. 28, 1993

[30] Foreign Application Priority Data

Feb. 7, 1992 [JP] Japan .................................. 4-056948

[51] Int. Cl.$^6$ ....................................................... H01S 3/08
[52] U.S. Cl. .................. 372/92; 372/95; 372/99; 372/61; 372/101; 372/107; 372/64
[58] Field of Search ..................................... 372/99, 55, 92, 372/69, 32, 107, 101, 106, 95, 61

[56] References Cited

U.S. PATENT DOCUMENTS

| | | | |
|---|---|---|---|
| 3,617,927 | 11/1971 | Pohl | 372/99 X |
| 3,995,230 | 11/1976 | See | 372/99 X |
| 4,050,036 | 9/1977 | Chambers et al. | 372/99 X |
| 4,292,602 | 9/1981 | Bergqvist | 372/108 |
| 4,504,956 | 3/1985 | Ream | 372/107 |
| 4,516,244 | 5/1985 | Holmes | 372/99 |
| 4,682,053 | 7/1987 | Pickett et al. | 372/99 X |
| 4,704,583 | 11/1987 | Gould | 372/55 X |
| 5,099,492 | 3/1992 | Zajdman et al. | 372/99 |
| 5,148,443 | 9/1992 | Du et al. | 372/107 X |

FOREIGN PATENT DOCUMENTS

| | | |
|---|---|---|
| 0383586A2 | 8/1990 | European Pat. Off. . |
| 3013217A1 | 10/1980 | Germany . |
| 0048884 | 3/1988 | Japan .................................. 372/107 |

OTHER PUBLICATIONS

"Low–Order $TE_{02}$ Operation of a $CO_2$ Laser for Transmission Trough Circular Metallic Waveguides".
Marhic et al., 25 Feb. 1981, pp. 743–745, Applied Physics Letters vol. 38(10).
V. M. Weerasinghe et al. "Properties of a Laser Beam Generated from an Axicon Resonator", Optics & Laser Technology, vol. 21, No. 6, 1989, pp. 389–391.

*Primary Examiner*—Rodney B. Bovernick
*Assistant Examiner*—Hemang Sanghovi
*Attorney, Agent, or Firm*—Fish & Richardson

[57] ABSTRACT

A laser beam generator has a pair of opposing mirrors. A reflecting surface of at least one of the opposing mirrors is constituted by a conical surface having a vertex angle of 90 degrees in order to tangentially polarize a laser beam. This conical surface is diverged toward the other opposing mirror at an angle of 45 degrees with respect to an optical axis from its vertex held alignment with the optical axis.

4 Claims, 3 Drawing Sheets

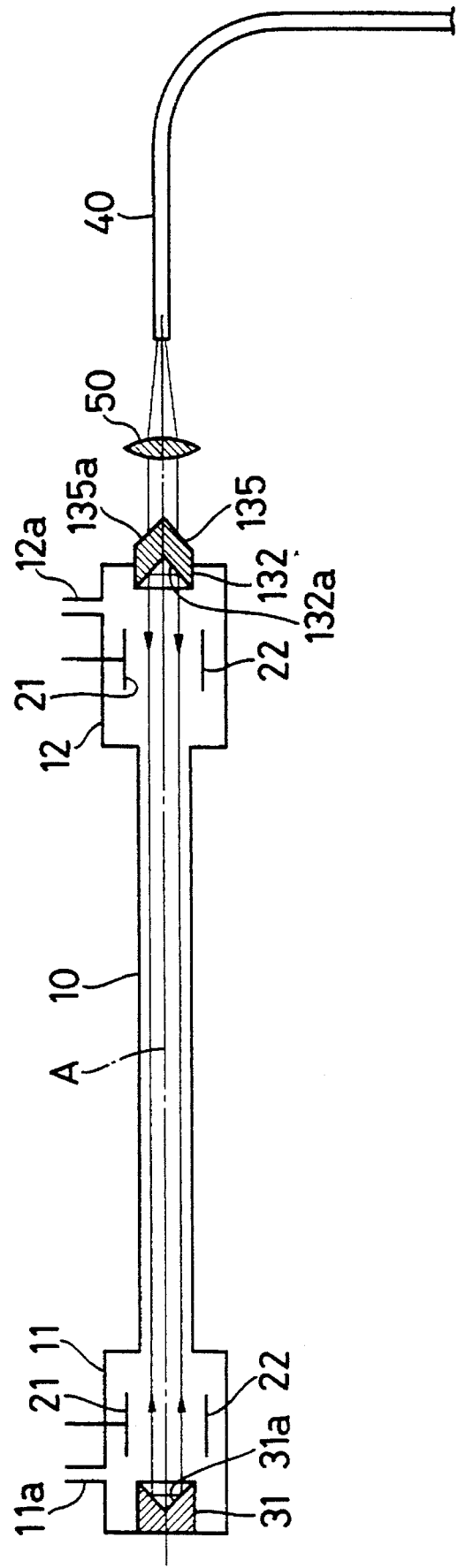

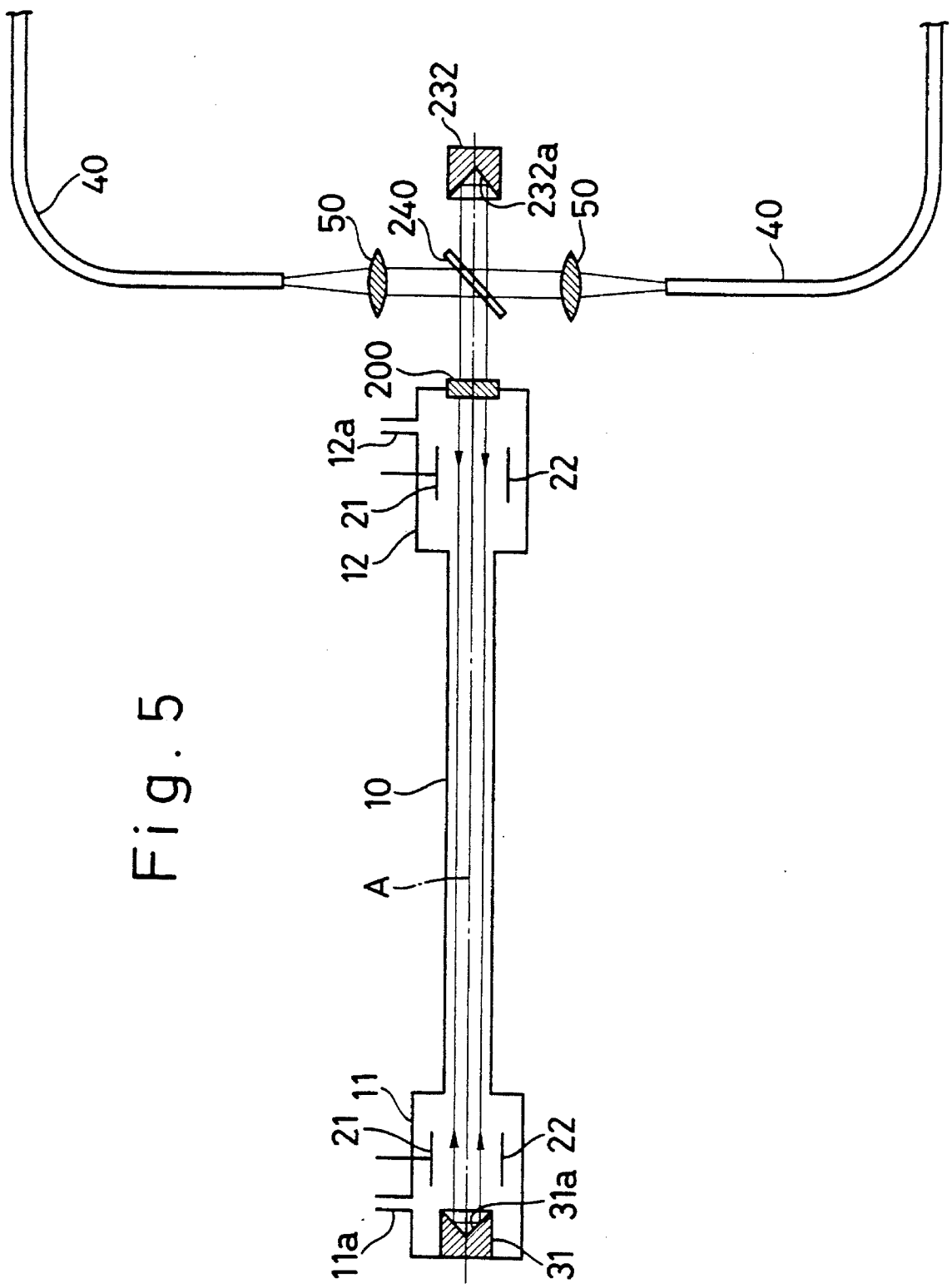

LASER BEAM GENERATOR

BACKGROUND OF THE INVENTION

This invention relates to an apparatus for generating a laser beam having a high transmission efficiency.

A wave guide tube for transmitting a laser beam is known. The laser beam passes through the wave guide tube while being reflected by an inner peripheral surface of the wave guide tube. It is advantageous that the wave guide tube has a circular shape in section. The reasons are that a sectionally circular wave guide tube can be bent freely in any direction and that bending resistances of the wave guide tube are constant in all directions.

In order to enhance the transmission efficiency at the time when the laser beam passes through the sectionally circular wave guide tube, a tangentially polarized laser beam (laser beam of $TE_{01}$ mode) is most preferable. Applied Physics Letters Vol. 38(10) 1981 carries an article titled "Low-order $TE_{0Q}$ operation of a $CO_2$ laser for transmission through circular metallic waveguides", In this article, there is disclosed a $CO_2$ laser beam generator made for the purpose of generating a laser beam of $TE_{0Q}$ mode. This laser beam generator comprises a discharge tube containing a $CO_2$ gas. A first mirror and a convex lens are disposed at opposite ends of this discharge tube. A straight metal tube and a second mirror are disposed axially of this discharge tube. Reflecting surfaces of the first and second mirrors are held opposite to each other. The above convex lens and metal tube are disposed between the first and second mirrors. A laser beam reflected by the first mirror in parallel relation to an optical axis of this laser beam is made incident to and condensed by the convex lens, and then supplied to one end portion of the metal tube. The laser beam thus supplied to the metal tube passes therethrough while being reflected by an inner peripheral surface of this metal tube, and is then emitted from the other end of the metal tube. This laser beam is reflected by the second mirror so as to enter again into the other end of the metal tube. The laser beam thus entered into the metal tube passes therethrough while being reflected by the inner peripheral surface of this metal tube as in the manner above mentioned, and then proceeds from the above mentioned one end toward the convex lens while being diverged. This laser beam is made parallel to the above optical axis by the convex lens and caused to proceed toward the first mirror so as to be reflected by this first mirror. During such reciprocating process of the laser beam between the first and second mirrors, the laser beam is amplified, and polarized into $TE_{0Q}$ mode by the metal tube. One of the first and second mirrors is of a semitransparent type. The above amplified laser beam is allowed to transmit through this semitransparent mirror and outputted.

Although the first mirror has a concave reflecting surface, this is only for the purpose of correcting the divergence of the laser beam so as to hold it in parallel relation to the optical axis, and the concave reflecting surface does not have the function for tangentially polarizing the laser beam. Since the radius of curvature of the reflecting surface of the first mirror is approximately 5 m whereas the diameter of the discharge tube is approximately 11 mm, this reflecting surface can be regarded as a generally planar surface.

In the above laser beam generator, since the metal tube for making a laser beam into $TE_{0Q}$ mode is required to be disposed linearly of and away from the discharge tube, the overall length of the laser beam generator is obliged to become long. Moreover, when the generated laser beam is transmitted through the sectionally circular wave guide tube, the transmission efficiency is high if the wave guide tube is straight, but the transmission efficiency is significantly lowered if the wave guide tube is bent at a small radius of curvature.

SUMMARY OF THE INVENTION

It is therefore an object of the present invention to provide a laser beam generator, in which a laser beam having a high transmission efficiency can be supplied to a sectionally circular wave guide tube without increasing the apparatus in size.

According to the present invention, there is provided a laser beam generator, comprising:

(a) a first and a second mirrors disposed on an optical axis and away from each other, the first and second mirrors respectively having reflecting surfaces opposite to each other, an optical path for a laser beam to reciprocate being formed between the first and second mirrors, the reflecting surface of at least one mirror of the first and second mirrors being constituted by a conical surface having a vertex angle of 90 degrees, this conical surface being in alignment at a vertex thereof with the optical axis and diverged toward the other mirror opposite to the one mirror from the vertex at an angle of 45 degrees with respect to the optical axis;

(b) emission means for emitting a laser beam from the optical path between the first and second mirrors;

(c) a laser medium disposed between the first and second mirrors; and (d) pumping means for pumping the laser medium.

BRIEF DESCRIPTION OF THE DRAWINGS

FIGS. 4 and 5 are sectional views schematically showing modified laser beam generators of the present invention, respectively.

DETAILED DESCRIPTION OF THE EMBODIMENTS

The present invention will be described hereinafter with reference to the drawings.

Figure 1:
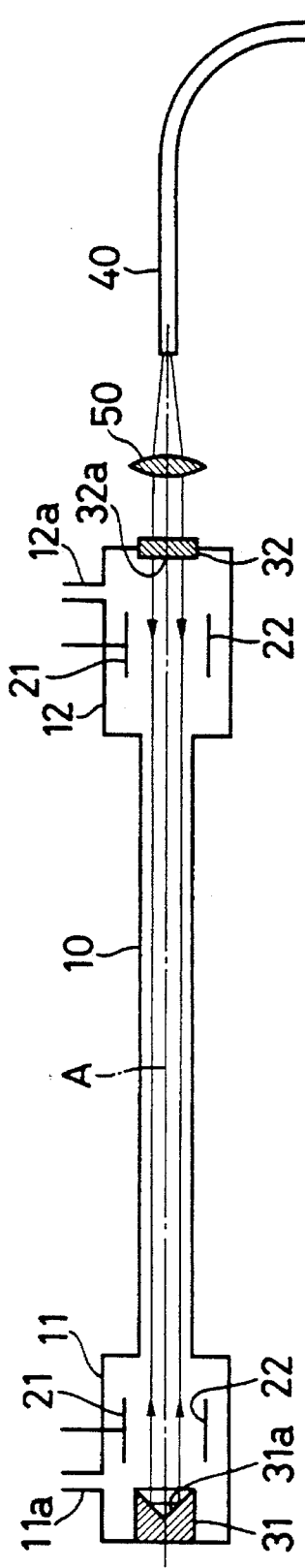
FIG. 1 is a sectional view schematically showing a laser beam generator of the present invention.

As shown in FIG. 1, A laser beam generator is a $CO_2$ laser beam generator and comprises a discharge tube 10. This discharge tube 10 has opposite end portions 11 and 12 of a large diameter. A gas inlet port 11a and a gas outlet port 12a are formed in peripheral walls of the opposite end portions 11 and 12, respectively. Gas chiefly composed of a $CO_2$ gas is supplied into the discharge tube 10 through the inlet port 11a, and discharged from the outlet port 12a.

A pair of discharge electrodes 21 and 22 for pumping the above gas are disposed respectively in the opposite ends 11 and 12 of the discharge tube 10.

Furthermore, mirrors 31 and 32 are disposed respectively at the opposite ends 11 and 12 of the discharge tube 10. The mirrors 31 and 32 respectively have reflecting surfaces 31a and 32a faced with each other. One mirror 31 is made of material capable of reflecting an infrared radiation, such as aluminum, copper, stainless steel, or the like. The reflecting surface 31a of this mirror 31 is formed into a conical surface having a vertex angle of 90 degrees and mirror finished. This conical surface is diverged toward the other mirror 32 at an angle of 45 degrees with respect to a center axis of the discharge tube 10, namely, an optical axis A, with the vertex of this conical surface located on the optical axis A. The other mirror 32 is made of material capable transmitting an infrared radiation, such as ZnSe, and has a flat plate shape. The reflecting surface 32a of this mirror 32 is perpendicular to the above optical axis. This reflecting surface 32a is coated with a metal material capable of reflecting an infrared radiation in such a manner as that this mirror 32 permits a part of the laser beam to transmit. The reflective index of the mirror 32 is about 50 to 90% with respect to the laser beam.

One end of a metal wave guide tube 40 is disposed on the optical axis A in such a manner as to be away from the mirror 32. Furthermore, a convex lens 50 is disposed on the optical axis A between the mirror 32 and the one end of the wave guide tube 40. A material of the wave guide tube 40 is preferably the same to that of the above mirror 31.

Figure 3:
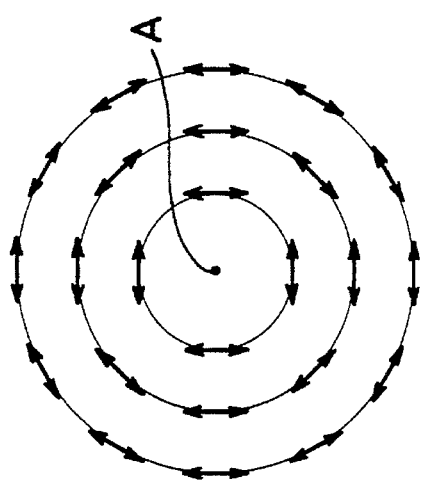
FIG. 3 is a sectional view showing a laser beam in a polarized condition.

With the above construction, the laser beam in the infrared area generated within the discharge tube 10 is further amplified by a stimulated emission while the laser beam reciprocates within and between the mirrors 31 and 32. Furthermore, this laser beam is tangentially polarized with respect to the optical axis A as shown in FIG. 3 each time it is reflected by the reflecting surface 31a of the mirror 31 having the conical surface. Since the reflecting surface 31a is inclined 45 degrees with respect to the optical axis A, the laser beam is reflected twice by the reflecting surface 31a and proceeded toward the mirror 32 in such a manner as to be in parallel relation to the optical axis A.

Figure 2:
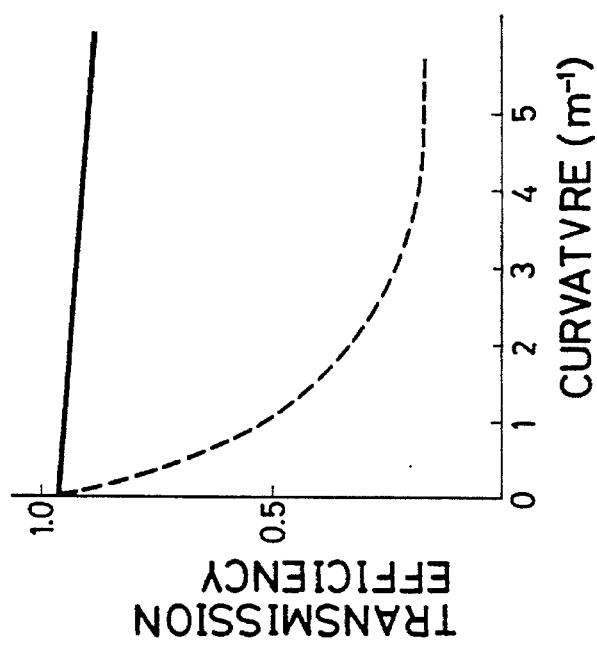
FIG. 2 is a graph showing a laser beam transmission efficiency with respect to a wave guide tube curvature.

The laser beam thus amplified is caused to transmit the mirror 32, focused by the convex lens 50, and then supplied to the one end of the wave guide tube 40. Since the laser beam is sufficiently tangentially polarized, as shown by the solid line of FIG. 2, a high transmission efficiency is maintained even in the event the wave guide tube 40 is bent at a large curvature, i.e., at a small radius of curvature. As a comparison example, the transmission efficiency of the laser beam obtained by the apparatus described in the above article is shown by the broken lines in FIG. 2.

In the above laser beam generator, since the conical reflecting surface 31a of the mirror 31 disposed at one end portion of the discharge tube 10 is used as means for obtaining the tangentially polarized laser beam, the metal tube of the above mentioned conventional apparatus can be eliminated, and therefore, the apparatus can be made compact in size.

Another embodiment of the present invention will now be described. Corresponding members to those of the preceding embodiment are denoted by identical reference numerals and description thereof is omitted. In the embodiment shown in FIG. 4, two opposing mirrors 31 and 132 respectively have reflecting surfaces 31a and 132a of conical surfaces. The mirror 132 is of a semitransparent type the same as the mirror 32 of the embodiment of FIG. 1. A projection 132 having a conical surface 135a is formed at that side of the mirror 32 opposite to the reflecting surface 132a. This conical surface 135a has an identical configuration to that of the reflecting surface 132a, and is inclined 45 degrees with respect to an optical axis A with the vertex of the conical surface 135a located on the optical axis A. The laser beam is refracted by the reflecting surface 132a to pass through the mirror 132, refracted again by the conical surface 135a so as to brought back to a beam of light parallel to the optical axis A, and then made incident to a convex lens 50. In this embodiment, since the two mirrors 31 and 132 respectively have the reflecting surfaces 31a and 132a of conical surfaces, the laser beam can be more efficiently tangentially polarized.

In a further embodiment shown in FIG. 5, a transparent plate 200 for transmitting an infrared radiation, made of ZnSe is mounted at one end portion 12 of a discharge tube 10 on an optical axis A. Besides the discharge tube 10, a mirror 232 is disposed on the optical axis A in such a manner as to be away from and faced with this transparent plate 200. This mirror 232 is made of the same material as the mirror 31 and has the same shape as a mirror 31. A reflecting surface 232a of the mirror 232 is faced with a reflecting surface 31a of the mirror 31. Furthermore, a semitransparent type mirror 240 is disposed on the optical axis A. This mirror 240 is made of ZnSe into a flat plate shape, and one surface of the mirror 240 is coated with a reflecting material in such a manner as that the transmission factor of this mirror 240 is 50 to 95%. Also in this embodiment, since the reflecting surfaces 31a and 232a of the two mirrors 31 and 232 respectively have conical surfaces, the laser beam can be efficiently tangentially polarized. The amplified laser beam is reflected by the mirror 240 so as to proceed in two directions perpendicular to the optical axis A and opposite to each other, and then condensed respectively by convex lenses 50 so as to be supplied to one end of a wave guide tube 40.

The present invention is not limited to the above embodiments, but various changes and modifications can be made without departing from the spirit and scope of the invention. For example, this invention is likewise applicable to laser other than $CO_2$ laser.

Furthermore, although the laser beam according to the present invention is suitable to be transmitted through a wave guide tube whose inner peripheral surface is made of metal, it may be transmitted through a wave guide tube of a metal tube whose inner peripheral surface is provided with a dielectric such as germanium.

What is claimed is:

1. A laser beam generator, comprising:
   (a) a first mirror and a second mirror disposed on an optical axis and away from each other, said first and second mirrors respectively having reflecting surfaces opposite to each other, an optical path for a laser beam to reciprocate being formed between said first and second mirrors, the reflecting surface of at least one mirror of said first and second mirrors being constituted by a conical surface having a vertex angle of 90 degrees, this conical surface being in alignment at a vertex thereof with said optical axis and diverged toward the other mirror opposite to said one mirror from said vertex at an angle of 45 degrees with respect to said optical axis, said first and second mirrors provide the laser beam to be highly tangentially polarized with respect to the optical axis and said second mirror permitting a part of the laser beam from said optical path to transmit;
   (b) a laser medium disposed between said first and second mirrors;
   (c) pumping means for pumping said laser medium;
   (d) a convex lens for condensing the laser beam transmitted through and emitted from said second mirror, said convex lens being disposed on said optical axis in such a manner that said second mirror is disposed between said first mirror and said convex lens; and (e) a metal wave guide tube having a circular shape in section, one end of said wave guide tube being disposed on said optical axis in such a manner that said convex lens is disposed between said second mirror and said one end of said wave guide tube, thereby one end of said wave guide tube receives the laser beam condensed by said convex lens, an inner peripheral surface of said wave guide tube being provided as a reflecting surface for efficiently transmitting the tangentially polarized laser beam.

2. A laser beam generator according to claim 1, wherein the reflecting surface of said first mirror is constituted by said conical surface, and said second mirror has a flat plate shape, the reflecting surface of said second mirror being perpendicular to said optical axis.

3. A laser beam generator according to claim 1, wherein the reflecting surfaces of said first and second mirrors are constituted respectively by said conical surfaces, said second mirror being provided at that side thereof opposite to said reflecting surface thereof with a projection having a second conical surface, said second conical surface being disposed at an angle of 45 degrees with respect to said optical axis with a vertex of said second conical surface held in alignment with said optical axis.

4. A laser beam generator according to claim 1, in which said laser medium chiefly contains $CO_2$ gas, and said pumping means is discharge means, a tube being disposed coaxial with said optical axis, said $CO_2$ being filled in this tube, said discharge means being disposed in said tube, said first and second mirrors being disposed at opposite end portions of said tube.

* * * * *